July 22, 1969

H. B. RATH ETAL 3,456,437

SINGLE SPEED FLOATING CONTROL SYSTEM OPERATING BLEED VALVE TO
LIMIT TURBODISCHARGE PRESSURE TO A FIXED
DIFFERENTIAL BELOW EXHAUST PRESSURE

Filed April 12, 1967

INVENTORS:
HARRY B. RATH
LEO F. KASACZUN
BY

THEIR ATTORNEYS

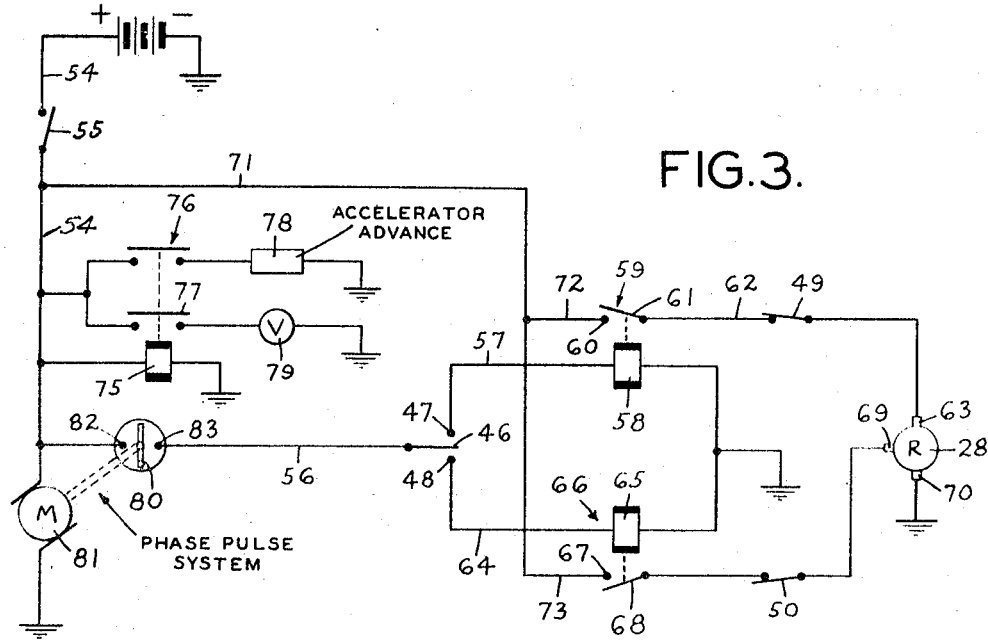
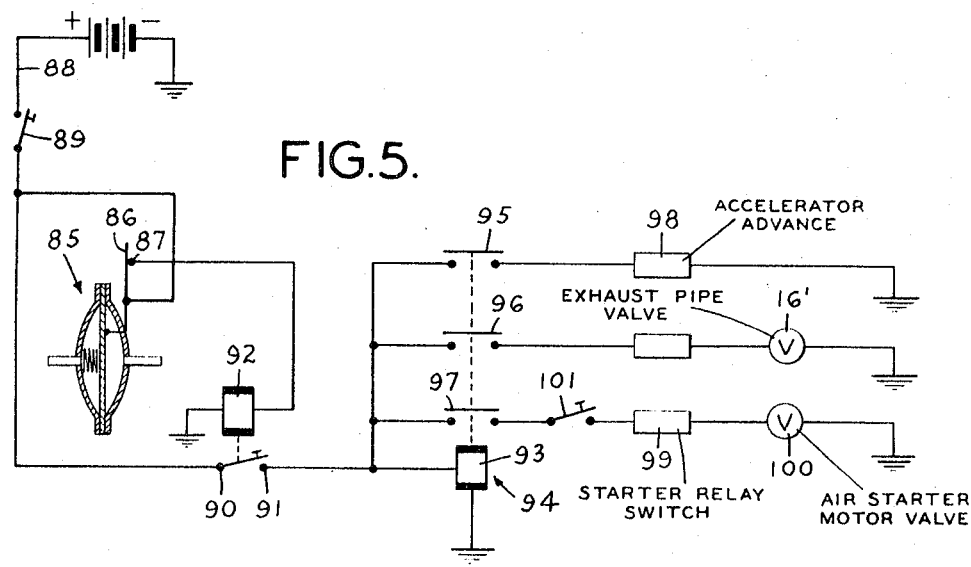

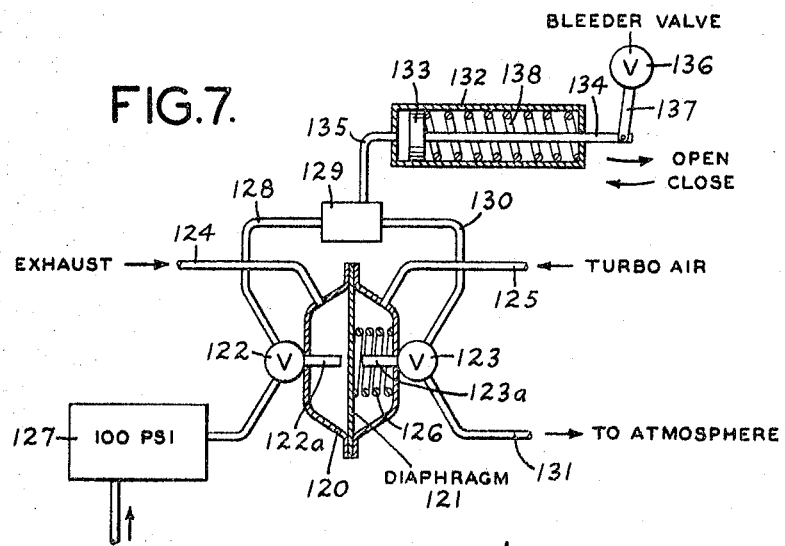
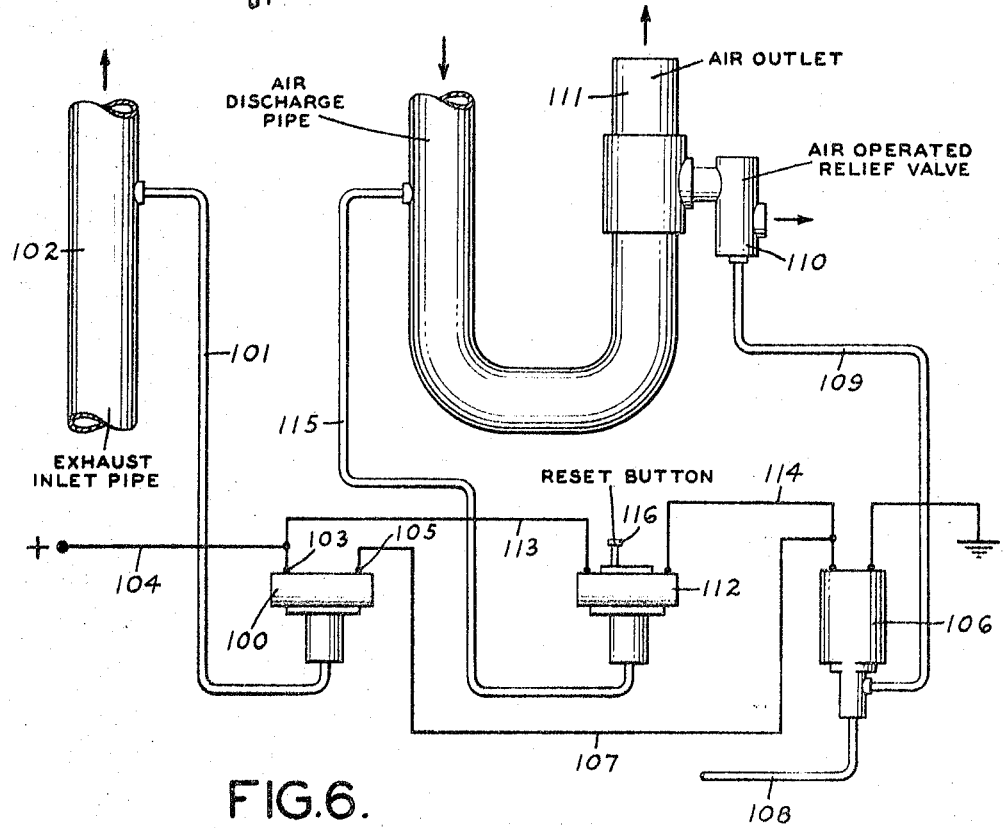

United States Patent Office 3,456,437
Patented July 22, 1969

3,456,437
SINGLE SPEED FLOATING CONTROL SYSTEM OPERATING BLEED VALVE TO LIMIT TURBO-DISCHARGE PRESSURE TO A FIXED DIFFERENTIAL BELOW EXHAUST PRESSURE
Harry B. Rath, Allentown, and Leo F. Kasaczun, Center Valley, Pa., assignors to Mack Trucks, Inc., Allentown, Pa., a corporation of New York
Filed Apr. 12, 1967, Ser. No. 630,337
Int. Cl. F02c *3/04, 9/02*
U.S. Cl. 60—13                                     14 Claims

ABSTRACT OF THE DISCLOSURE

An internal combustion engine system including an exhaust gas driven turbocharger for supplying air under pressure and means sensitive to the pressures of the exhaust gas and the air under pressure for reducing the pressure of the air supplied by the turbocharger when the exhaust gas pressure and the air pressure attain a relation which would cause damage to the turbocharger.

---

This invention relates to improvements in air supply means for tank-type vehicles such as trailers, semi-trailers or trucks for hauling materials requiring compressed air for their discharge, and more particularly to a system including an exhaust gas driven turbocharger for supplying air for the discharge of dry materials transported in such vehicles.

It is quite common to use tank or hopper-type trailers or semi-trailers or truck bodies for transporting finely divided material such as, for example, dry cement. Usually these vehicles have a hopper-type discharge provided with conduits by means of which compressed air or the like can be supplied to fluidize the material, e.g., cause the finely divided material to flow like water, and thus enable the material to be discharged without bridging or hanging in the tank or hopper of the vehicle. Heretofore, a self-contained internal combustion engine and piston-type or equivalent compressor has been used for supplying the air for fluidizing the cement or other finely divided material. Inasmuch as this extra equipment is expensive, heavy and occupies considerable space, it is not completely satisfactory.

It has also been proposed heretofore to use an exhaust gas driven turbocharger as a source of compressed air for discharging the dry material. An exhaust gas driven turbocharger is much less expensive, lighter in weight, occupies much less space than a completely self-contained compressor system. However, it has been found that the turbocharger can be damaged if the discharge hopper or tank becomes clogged, the conduit leading to the hopper or tank becomes clogged, or other situations arise causing overloading, surging or overheating of the turbocharger.

We have discovered that damage does not occur unless the compressor discharge pressure approaches or exceeds the exhaust gas pressure of the engine used for driving the turbocharger. Accordingly, in accordance with the present invention, systems are provided whereby a safe differential between the compressor discharge pressure, i.e., the compressed air pressure and the exhaust gas pressure for driving the turbine of the turbocharger is not exceeded.

More particularly, in accordance with the present invention, a preferred form of system embodying the invention includes a pressure differential sensitive means for controlling a valve whereby excess air pressure is bled off automatically when pressure conditions are encountered which would cause damage to the turbocharger.

In accordance with another embodiment of the invention, the engine is decelerated or stopped when the pressure differential becomes unsafe requiring examination and repair or restoration of the exhaust or pneumatic system to a proper operating condition before the engine can be operated to drive the turbocharger to supply compressed air. Variations of the system within the scope of the invention are described hereinafter in conjunction with the accompanying drawings, in which FIGURE 1 is a schematic side elevational view of a typical pneumatic system embodying the present invention;

FIGURE 3 is a schematic wiring diagram of the electrical circuit for the system disclosed in FIGURE 1;

FIGURE 5 is a wiring diagram of the electrical controls for a further modified type of system;

FIGURE 6 is a schematic illustration of another modification of the system; and

FIGURE 7 is a schematic illustration of still a further modification of the system.

Figure 1:
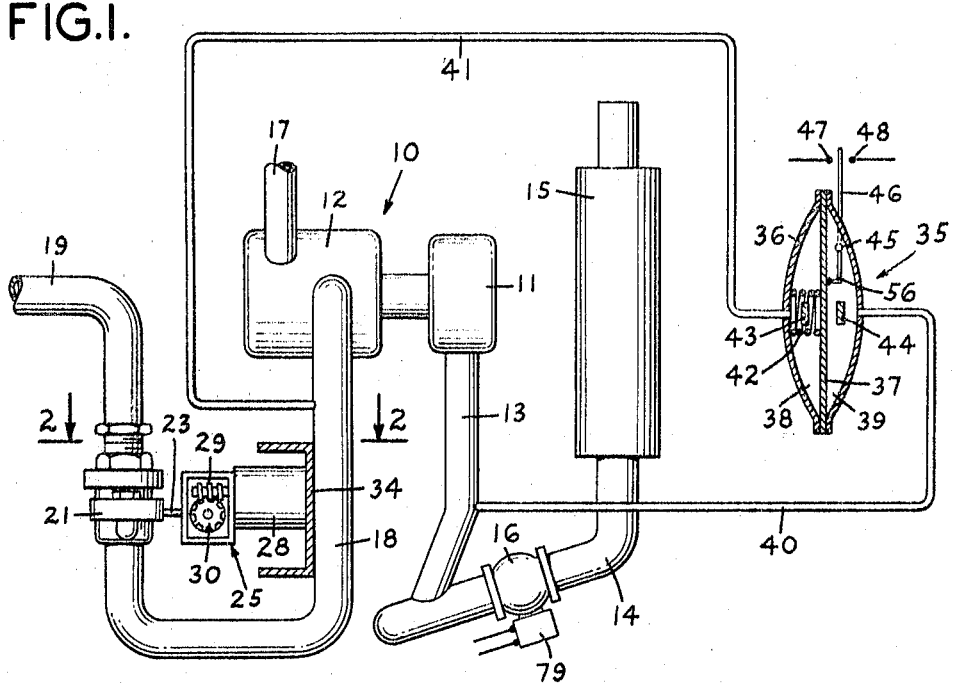

In accordance with the present invention, a vehicle for transporting dry material such as dry cement, or, for example, a truck or a tractor for a trailer having a tank or a closed hopper body, is provided with a turbocharger 10 including an exhaust gas driven turbine 11 which drives a rotary type compressor 12 of known type. The turbine 11 is connected by means of a conduit 13 to the exhaust pipe or manifold 14 of the internal combustion engine (not shown) used for propelling the vehicle. The exhaust pipe is provided with a muffler 15 of the usual type and a valve 16 is interposed in the exhaust pipe 14 between the conduit 13 and the muffler 15, the valve 16 being of the gate, butterfly, rotary or other type whereby the exhaust gases can be diverted from the muffler 15 through the conduit or pipe 13 to the turbine when compressed gas is to be supplied to the tank or hopper for conveying the dry powdered materials. The exhaust gases from the turbine 11 may be vented to atmosphere or through a muffler as desired.

Air is drawn into the rotary compressor 12 through an inlet 17 and discharged through a discharge conduit 18, to the conduit 19 which connects with the tank, hopper or other storage receptacle for the dry powdered material to supply compressed air thereto. A branch conduit 20 extends from the conduit 19 and is provided with a bleeder valve 21 by means of which air from the compressor 12 can be vented to atmosphere. The bleeder valve 21 shown in FIGURES 1 and 2 may be of any suitable type, for example, a globe valve, a butterfly valve or, as illustrated, a pivoted gate valve member 22 having an arm 23 extending from the valve casing and connected by means of a pivot 24 to a linear actuator 25 by means of which the valve is opened, closed or partially opened or closed, as may be required. The linear actuator may be a hydraulic jack, a pneumatic jack or a solenoid-actuated jack, but, as illustrated, is of the mechanical screw type including an actuating shaft 26 having a threaded portion which is received within an internally threaded sleeve 27 which, upon rotation in one direction, projects the shaft 26 and upon rotation in the other direction, retracts the rod 26. A reversible electric motor 28 is connected by means of a worm 29 and worm gear 30 to the threaded sleeve 27 for projecting and retracting the shaft 26 and actuating the gate valve 22 to either close it or open or partially open it to bleed off air from the compressor. As shown in FIGURE 2, the actuator 25 is provided with a T-shaped extension 31 which is supported by means of a pivot 32 on a mounting plate 33 fixed to a frame member 34 of the truck or other vehicle. The motor 28 is mounted on the actuator for movement with it.

Referring back to FIGURE 1, the means for controlling the pressure differential between the exhaust gas pressure in the manifold 14 and the discharge air pressure from the compressor 12 includes a pressure-sensitve device 35 including a hollow casing 36 spanned by a flexible diaphragm 37 and dividing the interior of the casing into two non-communicating chambers 38 and 39. Exhaust gas pressure is applied to the chamber 39 by means of a pipe 40 which is connected to the conduit 13 or the exhaust pipe 14 upstream of the valve 16. The discharge pressure of the compressor is supplied by means of a conduit 41 which is connected to the conduit 18 downstream of the compressor 12. Inasmuch as exhaust gas pressure is normally higher than the compressor pressure, a spring 42 may be provided for biasing the diaphragm to a neutral position between a pair of fixed stops 43 and 44 in the diaphragm casing 36. Connected to the diaphragm and supported by means of a pivot 45, either internally or externally of the casing 36, is a switch blade 46 which can engage either of two contacts 47 or 48, but during the normal operation of the system is spaced from both of these contacts so that minor fluctuations in the pressure differential will not cause the blade 46 and the contacts 47 and 48 to engage and cause "hunting."

The operation of the system thus far described generally is as follows. When the turbocharger is to be used as a compressor, the valve 16 is closed so that the exhaust gases are directed through the turbine 11 which drives the compressor 12 to supply the necessary pressure to the tank or other receptacle. The bleeder valve 21 normally is closed so that all of the air from the compressor is supplied to the tank or receptacle. When, due to the blockage of the conduit 19 or the discharge from the receptacle or for any other reason, the pressure begins to rise, the diaphragm 37 is deflected to the right as viewed in FIGURE 1, and when the pressure differential approaches an unsafe value, for example, about two pounds per square inch between the exhaust chamber 39 and the compressor air chamber 38, the switch blade 46 engages the contact 47, which actuates the linear actuator 25 to open or partailly open the gate valve 21 and thereby bleed off enough air to compensate for deviations from the fixed differential. If blockage is complete, the bleeder valve 21 may be completely open so that the air compressor is ineffective to supply additional air to the tank or receptacle, thereby maintaining a pressure differential of greater than two pounds. In practice, the pressure-sensitive device 35 may be adjusted to bleed off air at any differential pressure which avoids damage to the turbocharger. In some instances, damage does not occur when the air pressure exceeds the exhaust gas pressure by a small amount.

Figure 2:
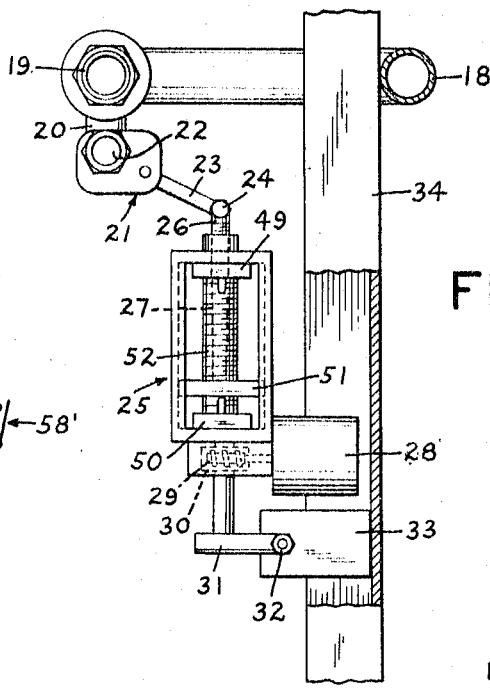
FIGURE 2 is a view in section taken on line 2—2 of FIGURE 1.

When the blockage or stoppage is overcome, the exhaust gas pressure will force the diaphragm to the left as viewed in FIGURE 1 moving the switch blade actuated contact 48, thereby reversing the direction of the motor 28 and causing the bleeder valve 21 to close partially or completely.

In order to avoid damage to the actuator or the bleeder valve, the actuator 25 may be provided with switches 49 and 50 which are actuated by a carriage member 51 which is also supported on and moved by threads 52 on the outside of the sleeve 27 in unison with the shaft 26, these switches shutting off the supply of current to the motor 28 at each limit of movement of the shaft 26.

The electrical control system including the elements described above is illustrated diagrammatically in FIGURE 3. The system may be operated from the battery of the vehicle so that one conductor 54 of the system is connected to one terminal of the battery. Inasmuch as the other terminal of the battery is usually grounded to the vehicle frame, the other terminals of the circuit likewise are grounded to the vehicle frame. A manually actuated switch 55 is connected in the conductor 54 and can be located in the vehicle cab to enable the operator of the vehicle to set the air-compressing system into operation. Connected to the conductor 54 is a conductor 56 which is connected to the switch blade 46 of the pressure-sensing device 35. The contact 47 of the pressure-sensing device is connected by means of a conductor 57 to the coil 58 of a relay which includes a normally open switch 59 including a fixed contact 60 and a movable blade 61, the latter being connected by means of a conductor 62 through the normally closed limit switch 49 to one terminal 63 of the reversible motor 28 to drive it in a direction to open the bleeder valve 21. Contact 48 of the pressure-sensing device 35 is connected by means of a conductor 64 to the coil 65 of a relay 66, including a fixed contact 67 and a movable blade 68, the latter being connected through the normally closed limit switch 50 to a terminal 69 of the motor 28 by means of which the direction of rotation of the motor 28 is reversed. A third terminal 70 of the motor is connected to ground. In order to energize the motor, a conductor 71 connects the conductor 54 and the conductors 72 and 73 to the fixed contacts 60 and 67 so that when either switch 59 or 68 is closed, the motor 28 is driven in a direction to open or close the bleeder valve 21 partially or completely, as required.

The vehicle engine much be operated at a relatively high r.p.m. to supply sufficient exhaust gases at sufficient pressure for driving the turbocharger. To that end, a relay coil 75 is connected between the conductor 54 and ground so that it is energized when the switch 55 is closed, thereby closing the relay switch 76 and 77 and connecting an accelerator advance mechanism 78 between the battery and ground. Also, closing of the relay switch 77 energizes a solenoid actuator 79, FIGURE 1, for closing the gate valve 16 to direct exhaust gas through the turbine 11.

As explained above, the pressure-sensitive device controls the motor 28 to open or close the bleeder valve 21 partially or completely, thereby not exceeding the desired pressure differential between the compressed air system and the exhaust gas to prevent damage to the turbocharger.

As a further operational control for the system, an interrupter or pulse system may be interposed between the battery and the switch blade 46. As shown, the interrupter may consist of a rotary contactor 80 driven at low r.p.m. by a motor 81 which intermittently engages fixed contacts 82 and 83 interposed in the conductor 56 to thereby intermittently supply electrical energy to the switch blade 46. The interrupter also aids in preventing "hunting" of the motor 28, that is, a shifting between "on" and "off" and reversing in response to intermittent pressure fluctuations of short duration.

Figure 4:
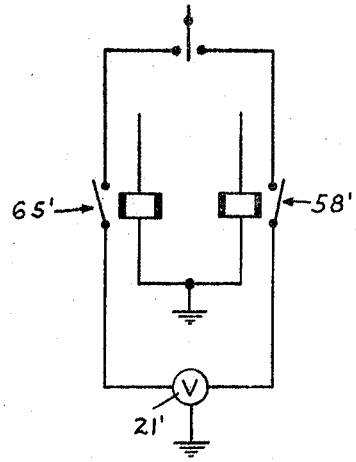
FIGURE 4 is a partial schematic wiring diagram for a modified type of system.

The above-described system can be simplified by subsituting a bleeder valve 21' as shown in FIGURE 4 of the open and shut type for the motor controlled valve shown in FIGURE 3. In this case, the relays 58' and 65' which correspond to the relays 58 and 65 may be connected directly to a solenoid actuator for the bleeder valve or to relays for actuating air valves for controlling a pneumatic cylinder to open or close the valve 21'.

FIGURE 5 illustrates a simplified system for preventing damage to the turbocharger when the pressure differential between the exhaust gas and the compressor discharge drops to an unsafe value. This system includes a pressure-sensing device 85 which includes a diaphragm-operated switch blade 86 and a single fixed contact 87 which are normally in engagement until the turbodischarge pressure approaches the predetermined unsafe differential pressure, whereupon the contacts 86 and 87 disengage. In this system, a conductor 88 is connected to one terminal of the battery and through a manually actuated switch 89 in the vehicle cab to the normally closed contacts 90 and 91 of manually resettable relay including a relay coil 92, one terminal of which is connected to the fixed contact 87 and the other to ground. The switch 86 is connected to the conductor 88.

The normally open relay and the manually closed switch 89 supply energy to the coil 93 of a three-switch relay 94, the other terminal of the coil 93 being grounded. The three switches 95, 96 and 97 of the relay 94 are normally maintained closed when the coil 93 is energized. The switch 95, when closed, actuates the accelerator advance control 98 to speed up the engine to compressor-operating speed, switch 96 causes the exhaust pipe valve 16' to close to divert exhaust gas to the turbocharger and switch 97 supplies energy for a starter relay switch 99 which actuates a solenoid valve 100 by means of which the air starter motor valve can be energized to start the vehicle engine, under the control of the series-connected driver-operated engine starting switch 101.

With the system described, when the switch 89 and the manual reset switch 90, 91 are closed, the coil 93 is energized and the switches 95, 96 and 97 are closed, thereby energizing the accelerator advance, closing the exhaust pipe valve and enabling the engine to be started by the driver by momentarily closing the starter switch 101. However, if back pressure develops increasing the pressure in the compressed air system to an unsafe value, the switch contacts 86 and 87 open, thereby de-energizing the relay coil 92 and opening the relay contacts 90 and 91 which thereby de-energizes relay coil 93 and allows the switches 95, 96 and 97 to open and de-energize the accelerator advance, open the exhaust pipe valve to the muffler and open the circuit to the starting motor valve. Consequently, the turbocharger no longer is effective and cannot be rendered effective until the operator or driver again closes the manual reset relay 90, 91 to again condition the system for operation.

The system can be simplified further by omitting the starting motor valve circuit and the accelerator advance circuit or the exhaust valve control circuit. If the exhaust valve circuit is omitted, the exhaust valve can be opened or closed manually or by a separate manually operated switch. If the accelerator advance circuit is omitted, the accelerator can be advanced manually and the exhaust valve control will act as a safety factor by directing gases through the muffler and allowing the turbocharger to come to a stop before damage occurs. Instead of the three control systems, the relay 93; can be used to open or close a relay in the ignition circuit of a spark ignition engine to stop the engine or to close a fuel valve in a compression ignition engine to stop it when the compressed air pressure becomes too high.

Another system which is responsive to exhaust gas back pressure and turbocharger air discharge pressure is illustrated in FIGURE 6. As shown therein, a pressure-sensitive electrical switch 100 is connected by means of a tube 101 to the engine exhaust pipe 102 leading to the turbocharger. The pressure-sensitive switch, which is of conventional type, is normally maintained open by the exhaust gas back pressure but will close when the exhaust gas back pressure drops below a predetermined minimum to which the pressure-sensitive switch 100 is adjusted. One terminal 103 of the switch is connected to the electrical circuit of the vehicle by conductor 104 and the other terminal 105 is connected to a solenoid-actuated air valve 106 by means of a conductor 107. When the exhaust back pressure is in a normal range, the solenoid valve 106 is closed so that air pressure supplied by means of the pipe 108 and the pipe 109 to a normally closed, air-operated relief or bleeder valve 110 connected to the air discharge pipe 111 of the turbocharger is shut off and the bleeder valve remains closed. However, if the exhaust gas back pressure drops below a minimum, for example, because of leaks in the exhaust system, the pressure-sensitive switch 100 will close, the solenoid valve 106 will be energized and opened, thereby supplying air pressure to the relief or bleeder valve 110 to open it and allow the air supplied by the turbocharger to be discharged to atmosphere. A minimum exhaust pressure is required to obtain a maximum turbo-discharge pressure.

A second normally open pressure-sensitive switch 112 is connected to the solenoid valve 106 parallel with the pressure-sensitive switch 100 by means of the conductor 113 and the conductor 114. The pressure-sensitive switch 112 is responsive to the air pressure from the turbocharger which is supplied from the pipe 111 by means of a pipe 115 to the pressure-sensitive switch 112. If for any reason, such as stoppage in the system, the pressure in the pipe 111 increases above a predetermined maximum, the pressure-actuated switch 112 is closed, thereby energizing the solenoid valve 106 and supplying air pressure to open air relief or bleeder valve 110 and vent the air from the air outlet pipe 111 to atmosphere. The switch 112 differs from the switch 100 in that it must be manually reset to open condition by means of a switch button 116. Accordingly, the operator must reset the switch 112 before the system again becomes operational and should correct the cause of the trouble in the system before resetting the switch 112. If the bleeder valve 110 is open and the switch 112 does not require resetting, the operator then is warned that the exhaust system requires examination for leakage or other damage.

An air-operated modification of the unloading system is illustrated in FIGURE 7. In this system, a pressure-sensitive device having a casing 120 containing a flexible diaphragm 121 is provided with a pair of plunger actuated valves 122 and 123. These valves may be mounted in the casing 120 with their plungers 122a and 123a on opposite sides of the diaphragm 121 but adjacent thereto. Pressure from the exhaust pipe is supplied to the casing 120 on one side of the diaphragm 121 by means of a pipe 124 while discharge air from the turbocharger is supplied to the casing 120 on the opposite side of the diaphragm 121 by means of a pipe 125. A spring 126 may be provided for biasing the diaphragm to compensate for higher exhaust pressure than turbocharger air pressure so that when the system is operating properly the diaphragm will not engage either of the plungers 122a and 123a.

Compressed air is supplied to the inlet of the valve 122 from a reservoir 127 which may be connected to the air compressor of the vehicle. The outlet of the valve 122 is connected by means of a pipe 128 to a small pressure tank 129.

The pressure tank 129 is also connected by means of a pipe 130 to the inlet of the valve 123 which has its outlet connected to atmosphere through a pipe 131. Both of the valves 122 and 123 are normally closed but are selectively opened to a greater or lesser extent by engagement of the diaphragm with the plunger 122a or 123a.

An air cylinder 132 including spring-biased piston 133 and piston rod 134 is connected by means of a pipe 135 to the pressure tank 129. A bleeder valve 136 connected to the air discharge of turbocharger (not shown) has an actuating arm 137 connected to the piston rod 134 so that on movement of the piston to compress the spring 138, the bleeder valve will be completely or partially opened, substantially in proportion to the air pressure in the tank 129. Upon drop of pressure in the tank 129, the bleeder valve will move toward a closed position.

In operation, with the engine running and the turbocharger in normal operation, the bleeder valve will be closed or substantially so. If the turbocharger discharge pressure increases due to a blockage in the system, the diaphragm 121 will be forced against the plunger 122a of the valve 122 and the valve will be partially or completely opened so that air from the reservoir 127 at a pressure, for example, of 100 pounds per square inch will be supplied to the pressure tank 129 and to the air cylinder 132, thereby forcing the piston 133 toward the right, compressing the spring 138 and opening or partially opening the bleeder valve 136. When the turbocharger air pressure in the casing 120 drops due to operation of the bleeder valve, the diaphragm 121 will return to its neutral position and the valve 122 will close, thereby maintaining a pressure in the tank 129 sufficient to maintain the bleeder valve in its partially or completely open position.

On the other hand, if the turbocharge air pressure drops or the exhaust gas pressure increases sufficiently, the diaphragm 121 will be flexed against the plunger 123a and opens or partially opens the valve 123 to allow air to be vented from the pressure tank 129 so that the spring 138 moves the piston 133 to the left, and closes or reduces the extent of opening of the bleeder valve until the diaphragm is again moved to a neutral position allowing both of the valves 123 to close. By properly adjusting the pressure of the spring 138 and the valves 122 and 123 with respect to the diaphragm 121, a safe minimum differential between the exhaust pressure and the turbodischarge pressure is assured and damage to the turbocharge is avoided, as described above.

If desired, the action of the cylinder 132 may be reversed so that the valve 136 will open when the air pressure is reduced in the cylinder 132 so that it will "fail safe" upon loss of air pressure in the cylinder or system.

It will be understood that other variations in the control circuit are possible wherein a pressure-sensing device may be utilized either for controlling the operation of the turbocharger or to bleed off excess pressure when the pressure differential between the exhaust gas and the compressor discharge becomes too low.

We claim:

1. An air compressor system for use with a source of exhaust gas comprising an exhaust gas-driven turbocharger having a turbine and a compressor, valve means for admitting exhaust gas to said turbine to drive it and said compressor to supply air under pressure and diverting gas away from said turbine to inactivate said turbocharger, conduit means connected to said compressor for conducting said air under pressure to a place of use independent of said source of exhaust gas, and pressure-sensitive means responsive to the relationship between the exhaust gas pressure supplied to said turbine and the pressure of said air supplied by said compressor for maintaining a differential pressure between said exhaust gas pressure and said air pressure sufficient to avoid damage to said turbocharger.

2. The system set forth in claim 1 in which said pressure-sensitive means comprises a casing, a movable diaphragm spanning said casing and dividing it into two separate chambers, means connecting one of said chambers to said means for supplying exhaust gas, means connecting the other chamber to said conduit means, said diaphragm being movable in response to said exhaust gas pressure and said air pressure.

3. The system set forth in claim 2 comprising means respnosive to movement of said diaphragm for bleeding air from said conduit means to atmosphere when said air pressure and gas pressure approach an unsafe differential relationship.

4. The system set forth in claim 2 comprising a bleeder valve connected to said conduit means, means for actuating said bleeder valve to open it at least partially and discharge air from said conduit means to atmosphere and to close said valve to prevent discharge of air from said conduit means to atmosphere, and actuator means responsive to movement of said diaphragm for opening and closing said bleeder valve.

5. The system set forth in claim 2 comprising means responsive to movement of said diaphragm for actuating said valve means to divert exhaust gas from said turbine when said air and gas pressure approach an unsafe differential relationship.

6. The system set forth in claim 2 comprising a bleeder valve connected to said conduit means, a valve member in said bleeder valve movable between an open position to vent air from said conduit means and a closed position to prevent air from being vented from said conduit means, a reversible power-driven actuator connected with said valve member for moving it between open and closed positions, and means responsive to said pressure-sensitive means for supplying power to said actuator to move said valve member selectively between said open and closed positions.

7. The system set forth in claim 1 comprising accelerator control means for increasing the volume and pressure of exhaust gas supplied to said turbine, and control means for actuating said valve means to admit gas to said turbine and actuating said accelerator control means to increase the volume and pressure of the exhaust gas supplied to said turbine.

8. The system set forth in claim 7 comprising means responsive to said pressure-sensitive means for deactivating said accelerator control means to decrease the volume and pressure of said exhaust gas supplied to said turbine.

9. The system set forth in claim 1 comprising means responsive to said pressure-sensitive means for discontinuing the supply of exhaust gas to said turbine when the pressure of said air and said exhaust gas pressure approach an unsafe differential relationship.

10. The system set forth in claim 9 in which said means for discontinuing the supply of exhaust gas to said turbine comprises switch means connected with said pressure-sensitive means, a relay having a coil connected with and energized by said switch means and normally disengaged contacts, means for manually engaging said contacts, said switch means being closed and said relay coil energized to retain the normally disengaged contacts in engagement while a safe differential pressure relationship exists between said air pressure and said exhaust gas pressure and opening when an unsafe differential relationship is approached to deenergize said relay coil and enable said contacts thereof to disengage.

11. The system set forth in claim 1 comprising a normally closed bleeder valve connected to said conduit means, electrically actuated means to open said bleeder valve to vent air from said conduit means, and said pressure sensitive means comprises a first switch connected to said electrically actuated means and sensitive to exhaust gas pressure for energizing said electrically actuated means to vent air from said conduit means when said exhaust gas pressure decreases below a predetermined minimum pressure, and a second switch connected to said electrically actuated means and sensitive to pressure in said conduit means for energizing said electrically-actuated means to vent air from said conduit means when the pressure in said conduit means exceeds a predetermined maximum.

12. The system set forth in claim 11 in which said second switch comprises manually resettable means for deenergizing said electrically activated means.

13. The system set forth in claim 1 in which said pressure-sensitive means comprises means forming a first chamber, means forming a second chamber, means connecting the first chamber to said means for supplying exhaust gas, means connecting the second chamber to said conduit means, and means operatively coupled to said first and second chambers and movable in response to said exhaust gas pressure and said air pressure.

14. The system set forth in claim 1 comprising a bleeder valve connected to said conduit means, pneumatically actuated means to open said bleeder valve to vent air from said conduit means, and in which said pressure-sensitive means comprises means forming a first chamber, means forming a second chamber, means connecting the first chamber to said means for supplying exhaust gas, means connecting the second chamber to said conduit means, means operatively coupled to said first and second chambers and movable in response to said exhaust gas pressure and said air pressure, means forming a pressure chamber, means connecting the pressure chamber to said pneumatically actuated opening means, a first valve adapted to be connected to a source of fluid under a first pressure for controllably communicating the first source of fluid pressure with the pressure chamber in response to movement of said movable means, and a second valve adapted to be connected to a source of fluid under a second pressure for controllably communicating the second source of fluid pressure with the pressure chamber in response to movement of said movable means.

References Cited

UNITED STATES PATENTS

| | | | |
|---|---|---|---|
| 2,005,821 | 6/1935 | Buchi | 60—13 |
| 2,567,486 | 9/1951 | Johansson | 60—13 |
| 1,557,793 | 10/1925 | Berger | 230—5 |
| 2,480,621 | 8/1949 | Warner | 60—13 |
| 2,559,623 | 7/1951 | Holmes | 60—13 |
| 2,645,409 | 7/1953 | Lawlor | 230—5 |
| 2,968,914 | 1/1961 | Birmann | 60—13 |

CARLTON R. CROYLE, Primary Examiner

DOUGLAS HART, Assistant Examiner

U.S. Cl. X.R.

123—119; 230—5